US012583430B2

(12) United States Patent (10) Patent No.: US 12,583,430 B2
Semeniuk et al. (45) Date of Patent: Mar. 24, 2026

(54) MULTI-CIRCUIT PROTECTION VALVE ASSEMBLY AND AIR PROCESSING UNIT

(71) Applicant: ZF CV SYSTEMS EUROPE BV, Brussels (BE)

(72) Inventors: Maciej Semeniuk, Jelenia Góra (PL); Marek Robak, Wroclaw (PL)

(73) Assignee: ZF CV SYSTEMS EUROPE BV, Brussels (BE)

( * ) Notice: Subject to any disclaimer, the term of this patent is extended or adjusted under 35 U.S.C. 154(b) by 37 days.

(21) Appl. No.: 18/924,225

(22) Filed: Oct. 23, 2024

(65) Prior Publication Data

US 2025/0137542 A1    May 1, 2025

(30) Foreign Application Priority Data

Oct. 26, 2023    (EP) ..................................... 23206058

(51) Int. Cl.
| | |
|---|---|
| *B60T 17/04* | (2006.01) |
| *B60T 13/26* | (2006.01) |
| *B60T 13/68* | (2006.01) |
| *B60T 17/18* | (2006.01) |
| *F16K 11/22* | (2006.01) |

(52) U.S. Cl.
CPC .............. *B60T 17/04* (2013.01); *B60T 13/26* (2013.01); *B60T 13/683* (2013.01); *B60T 17/18* (2013.01); *F16K 11/22* (2013.01)

(58) Field of Classification Search
CPC ........ B60T 17/04; B60T 13/683; B60T 13/23; B60T 17/18; F16K 11/22; F16K 17/04
See application file for complete search history.

(56) References Cited

U.S. PATENT DOCUMENTS 3,984,149 A * 10/1976 Reinecke ................ B60T 15/20
                                                            188/3 R
4,441,764 A *  4/1984 Newton .................. B60T 17/18
                                                            303/33
(Continued)

FOREIGN PATENT DOCUMENTS

| CN | 204956459 U * | 1/2016 |
|---|---|---|
| DE | 19842840 A1 | 3/2000 |

(Continued)

*Primary Examiner* — David Colon-Morales
(74) *Attorney, Agent, or Firm* — WARNER NORCROSS + JUDD LLP

(57) ABSTRACT

A multi-circuit protection valve assembly, comprises, is attached to or integrated into a main housing, and comprises an air inlet; main outlets; main supply lines; and main overflow valves for protecting the main outlets. The valve assembly further comprises an extension part having, attached to or integrated into an extension housing, an extension inlet; an extension outlet; an extension line; and an extension overflow valve for protecting the at least one extension outlet, wherein the extension housing is detachably fixed to the main housing such that the extension inlet is flow-connected to an auxiliary outlet in the main housing. The extension housing is detachably fixed to the main housing by a hollow screw having a cavity. Compressed air discharged through the auxiliary outlet can be conducted through the cavity inside the hollow screw to the extension overflow valve and the at least one extension outlet.

19 Claims, 3 Drawing Sheets

(56) References Cited

U.S. PATENT DOCUMENTS

| | | | | |
|---|---|---|---|---|
| 4,685,745 | A * | 8/1987 | Reinecke | B60T 17/18 |
| | | | | 303/191 |
| 4,775,192 | A * | 10/1988 | Pohl | B60T 15/20 |
| | | | | 303/54 |
| 4,817,501 | A * | 4/1989 | Seegers | B60T 11/34 |
| | | | | 91/532 |
| 4,817,502 | A * | 4/1989 | Seegers | B60T 11/34 |
| | | | | 91/532 |
| 4,919,492 | A * | 4/1990 | Samuelson | B60T 13/268 |
| | | | | 305/3 |
| 6,079,790 | A * | 6/2000 | Broome | B60T 8/00 |
| | | | | 303/119.2 |
| 6,612,321 | B1 | 9/2003 | Ertle | |
| 7,946,660 | B2 * | 5/2011 | Diekmeyer | B60T 17/004 |
| | | | | 303/3 |
| 8,844,573 | B2 * | 9/2014 | Mann | B60T 13/683 |
| | | | | 137/884 |
| 9,028,011 | B2 * | 5/2015 | Kaupert | B60T 17/02 |
| | | | | 303/122.09 |
| 9,102,311 | B2 * | 8/2015 | Kaupert | B60T 17/221 |
| 9,239,120 | B2 * | 1/2016 | Minato | B60G 17/0523 |
| 9,371,063 | B2 * | 6/2016 | Schnittger | B60T 17/22 |
| 10,207,694 | B2 * | 2/2019 | Minato | B60T 15/041 |
| 10,865,813 | B2 * | 12/2020 | Frank | F15B 21/048 |
| 11,021,142 | B2 * | 6/2021 | Riley | B60T 15/243 |
| 11,439,945 | B2 * | 9/2022 | Moon | B60T 17/00 |
| 11,479,227 | B2 * | 10/2022 | Moon | B60T 17/004 |
| 11,491,963 | B2 * | 11/2022 | Van Thiel | B60T 13/26 |
| 11,738,730 | B2 * | 8/2023 | Mellings | B60T 13/58 |
| | | | | 303/14 |
| 2003/0146661 | A1 * | 8/2003 | Hatch | B60G 17/0432 |
| | | | | 303/119.3 |
| 2022/0194340 | A1 * | 6/2022 | Schuppert | B60T 13/04 |
| 2022/0412382 | A1 * | 12/2022 | Zawisza | F15B 21/048 |

FOREIGN PATENT DOCUMENTS

| | | | | |
|---|---|---|---|---|
| DE | 102017000694 A1 * | 7/2018 | | B60T 17/18 |
| EP | 0738640 A2 * | 10/1996 | | B60T 13/261 |
| EP | 1884430 A2 * | 2/2008 | | F15B 21/048 |
| EP | 3878704 A1 * | 9/2021 | | F17D 1/07 |
| EP | 4029746 A1 * | 7/2022 | | B60T 13/66 |
| EP | 3924225 B1 * | 8/2023 | | B60T 3/362 |
| JP | 2006168393 A * | 6/2006 | | |
| TW | I238793 B * | 9/2005 | | F16K 27/003 |

* cited by examiner

MULTI-CIRCUIT PROTECTION VALVE ASSEMBLY AND AIR PROCESSING UNIT

CROSS-REFERENCE TO RELATED APPLICATIONS

This application claims priority to and all advantages of European Application No. 23206058.2 filed on 26 Oct. 2023, the contents of which are incorporated herein by reference.

The invention generally relates to a multi circuit protection valve assembly for a pressurized air system, in particular a pneumatic supply system of an air processing unit of a commercial vehicle, and an air processing unit comprising the same.

BACKGROUND OF THE INVENTION

Electropneumatic systems in commercial vehicles generally comprise a compressor, an air processing unit for providing drying and filtering the compressed air delivered by the compressor, a multi-circuit protection valve assembly for distributing the dried and filtered compressed air to consumer circuits, simultaneously separating the consumer circuits from each other. Thereby, the consumer circuits include, in particular, pneumatic brake circuits, air suspension systems, and the like. The air processing unit generally comprises one or more desiccant air dryer cartridges filled with moisture-adsorbing materials like granulate. The compressed air is dried or de-moisturized in a drying mode, and the dried compressed air is then supplied to the multi-circuit protection valve assembly that distributes it to the subsequent consumer circuits. The air dryer cartridge can also be regenerated or purged in a regeneration mode, in which air flows in the reverse direction through the air dryer cartridges to a venting outlet.

The multi-circuit protection valve assembly generally comprises several air circuits in which the compressed air is distributed, wherein the compressed air is received via an air inlet and is then supplied to several main outlets that are each coupled to a certain consumer circuit. The compressed air is distributed via several main supply lines, each being flow-connected or flow-connectable to the air inlet and each being flow-connected or flow-connectable to at least one of the main outlets. Further, main overflow valves or check valves are located in each of the main supply lines for protecting the main outlet that is flow-connected or flow-connectable to the respective main supply line containing this main overflow valve. Thereby, the main overflow valves prevent air from escaping from all of the consumer circuits in case of a pressure loss in one of the consumer circuits. Thereby, the main overflow valve or check valve is in its closed position as long as the air pressure in the air inlet is lower than an opening pressure. The pass-through position of the respective main overflow valve or check valve is preferably set once the air pressure of the compressed air in the air inlet is exceeding the opening pressure. In case of a pressure loss in one of the consumer circuits, the closed position is automatically set.

Further, the air inlet, the main outlets, the main supply lines and the main overflow valves are attached to or are integrated into a main housing of the multi-circuit protection valve assembly. To extend the multi-circuit protection valve assembly with further protected ports or outlets an extension part can be provided, having an extension inlet for receiving compressed air, at least one extension outlet for discharging the received compressed air to a consumer circuit that is coupled to the respective extension outlet, an extension line being flow-connected or flow-connectable to said extension inlet and to the at least one extension outlet, and an extension overflow valve being located in the extension line for protecting the at least one extension outlet flow-connected or flow-connectable to the extension line containing the extension overflow valve.

Each of these extending elements is attached or integrated into an extension housing, wherein the extension housing is detachably fixed to the main housing such that the extension inlet is flow-connected to an auxiliary outlet in the main housing, wherein the auxiliary outlet is flow-connected or flow-connectable to said air inlet in the main housing. Thereby, the extension part or the extension housing is directly screwed to the main housing via screws each piercing through the extension housing and the main housing. The housings are positioned to each other such that the extension inlet is coaxially overlapping the auxiliary outlet, ensuring a flow-connection.

Such a multi-circuit protection valve assembly or air processing unit already having several protected circuits and ports is a very compact device having a specific or predetermined design that results in a specific construction of the main housing. Thus, extending the device for providing further extension ports or extension outlets that are protected by further extension overflow valves is not always possible as the dimension or design are restricted in some way.

It is therefore an object of the invention to provide a multi-circuit protection valve assembly and an air processing unit that allows functional extension in an easy, flexible, and comfortable way.

SUMMARY OF THE INVENTION

This object is realized by a multi-circuit protection valve assembly and an air processing unit according to the independent claims. The subclaims describe preferred embodiments of the invention.

According to the invention, the multi-circuit protection valve assembly is characterized in that, the extension housing is detachably fixed to the main housing by a hollow screw or banjo bolt having a cavity inside its shaft, wherein the hollow screw passes through the extension housing and is screwed directly into the auxiliary outlet such that the extension housing is clamped to the main housing, and such that compressed air discharged through the auxiliary outlet can be conducted through the cavity inside the hollow screw to the extension over-flow valve and the at least one extension outlet in case the extension over-flow valve is in its open state or pass-through position. The pass-through position is preferably set once the air pressure of the compressed air in the extension inlet or cavity is exceeding an opening pressure.

Hence, the multi-circuit protection valve assembly or air processing unit can be easily expanded by adding an extension part having at least one, preferably at least two or more protected extension ports or extension outlets, wherein the fixation means for fixing the extension part or the extension housing to the main housing, i.e., the hollow screw, at the same time provides an air channel or cavity for deliberately guiding the compressed air to the additional extension overflow valve prior to reaching the respective extension outlet. Thus, the hollow screw advantageously fulfils a dual function, i.e., the fixation of the extension part and securely conveying the compressed air at the interface between the main housing and the extension housing. In addition, the coaxial positioning or overlapping of the extension inlet and the auxiliary outlet is automatically ensured. Hence, a space-saving and secure expansion of functionality is provided, wherein the auxiliary outlet that is not necessarily protected by an overflow valve inside the main housing, is extended in functionality by providing at least one, preferably at least two additional protected ports.

The invention also relates to an air processing unit comprising the claimed multi-circuit protection valve assembly, and an air supply unit having a compressor port for connecting a compressor providing compressed air, an air dryer cartridge for drying and filtering the received compressed air, operating valves (regeneration valve, purging valve, compressor valve) for setting operating phases of the air supply unit (regeneration, drying, etc.), wherein the air supply unit is connected to the air inlet of the multi-circuit protection valve assembly. Further, the air supply unit is at least partially attached to or integrated into the main housing for providing a compact unit.

According to a preferred embodiment, the extension housing comprises a coupling part having an inner chamber with a first opening at a first terminal end, the first terminal end forming the extension inlet, wherein the hollow screw extends through said inner chamber and an end region of the hollow screw protrudes out of the first opening of the inner chamber, wherein the end region comprises an external thread being screwed into the auxiliary outlet for clamping the extension housing to the main housing via the hollow screw. This provides an easy way of coupling the extension housing to the main housing by inserting the hollow screw into the extension housing and tightening the screw.

Preferably, the threaded end region of the hollow screw comprises an axial opening that transitions into the cavity for receiving compressed air from the auxiliary outlet. Hence, an easy way of guiding the compressed air from the auxiliary outlet into the cavity of the hollow screw is provided.

According to a preferred embodiment, the inner chamber of the coupling part comprises a second opening at a second terminal end opposite to the first terminal end, wherein the hollow screw protrudes out of the second opening, wherein a head of the hollow screw, being positioned opposite to the threaded end region, touches the second terminal end of the coupling part for clamping the extension housing to the main housing via the hollow screw. This provides an easy way of fixing the extension part or extension housing to the main housing, as the extension housing is automatically clamped between the head of the hollow screw and the auxiliary outlet once the hollow screw is tightened.

According to a further embodiment, a shaft of the hollow screw, located between the head and the threaded end region, is coaxially positioned inside the inner chamber of the coupling part (and also coaxially to the auxiliary outlet), wherein the cavity coaxially extends through the shaft and through the end region, wherein at least one radial opening is provided in the shaft that is flow-connected with the cavity inside the shaft, wherein the cavity is axially delimited by an intermediate part joint to or integral with the head. This allows compressed air received from the auxiliary outlet through the axial opening in the end region to be guided through the cavity and out of the radial openings afterwards.

In particular, the extension housing further comprises a feeding chamber, preferably vertically extending away from the inner chamber of the coupling part, wherein the at least one radial opening in the shaft provides a flow-connection between the cavity inside the shaft and the feeding chamber in the extension housing, in particular, in that the at least one radial opening at least partially overlaps with a feeding opening in the feeding chamber. Consequently, compressed air provided in the cavity can be easily and securely guided into the feeding chamber through the radial opening, wherein the feeding opening simultaneously connects the inner chamber with the feeding chamber, providing a simple assembly.

Further, the feeding chamber might be delimited by a movable piston that is a part of the extension overflow valve such that the air pressure inside the feeding chamber is also acting on the piston, wherein the piston is guided in the extension housing and interacts with a spring that spring-preloads the piston against a valve seat with a certain spring force, in particular, such that a flow-connection to an outlet channel leading to the at least one extension outlet is prevented as long as the spring-preloaded piston touches the valve seat, and is permitted once the air pressure inside the feeding chamber is high enough to lift the spring-preloaded piston from the valve seat against the spring force.

This allows for an easy implementation or integration of the extension overflow valve into the extension housing, wherein according to a preferred embodiment, the valve seat is located around a circumference of a terminal end of the outlet channel that is integrally formed in the extension housing, such that a flow-connection between the feeding chamber and the outlet channel is prevented as long as the piston touches the circumference of the terminal end. This is a simple way of allowing or cutting of the flow-connection, wherein the feeding chamber is preferably coaxially surrounding the outlet channel, being cylindrical shaped, for example. Thereby, the cavity of the hollow screw, the feeding chamber and the outlet channel may form the extension line of the extension part.

According to a further embodiment, at least a first valve opening, and preferably at least a second valve opening, is formed in the outlet channel for connecting the outlet channel to the at least one extension outlet, preferably to at least two extension outlets, allowing a compact and simple construction of the extension part. Further, at least a fifth check valve is positioned in the first valve opening, and preferably a sixth check valve is positioned in the second valve opening, additionally securing the extension outlets.

According to a further embodiment, the extension part is additionally secured to the main housing by a pin inserted into the extension housing of the extension part and into the main housing for preventing a tilting and/or twisting of the extension housing against the main housing. Consequently, an additional securing means is provided that ensures a persistent functionality of the extension part preferably without disruption.

According to a further embodiment, the pin is inserted, e.g., screwed, bonded, clipped, into a securing recess in the extension housing and passes through a securing opening in the main housing with the part that projects out of the securing recess. Preferably, the securing recess is spaced apart from the extension inlet and the securing opening is spaced apart from the auxiliary outlet such that a twisting and/or tilting can be prevented efficiently.

According to a further embodiment, no main overflow valve and no extension overflow valve is located between the air inlet of the main housing and the auxiliary outlet in the main housing (or the extension inlet of the extension part). Hence, the extension part can be used to provide an additional protected circuit having at least one extension outlet, preferably at least two (or even more) extension outlets.

According to a further embodiment the multi-circuit protection valve assembly comprises at least four main overflow valves in at least four main supply lines, and wherein the main housing is one-parted or multi-parted, including the at least four main overflow valves and the at least four main supply lines, wherein the main housing preferably comprises up to seven main outlets. Consequently, the extension part allows for an easy extension from seven to at least eight, preferably nine, ports overall and thereby comprising at least five protected circuits.

BRIEF DESCRIPTION OF THE DRAWINGS

The invention is hereinafter described in detail with reference to the accompanying drawings, wherein.

DETAILED DESCRIPTION OF THE INVENTION

Figure 1:
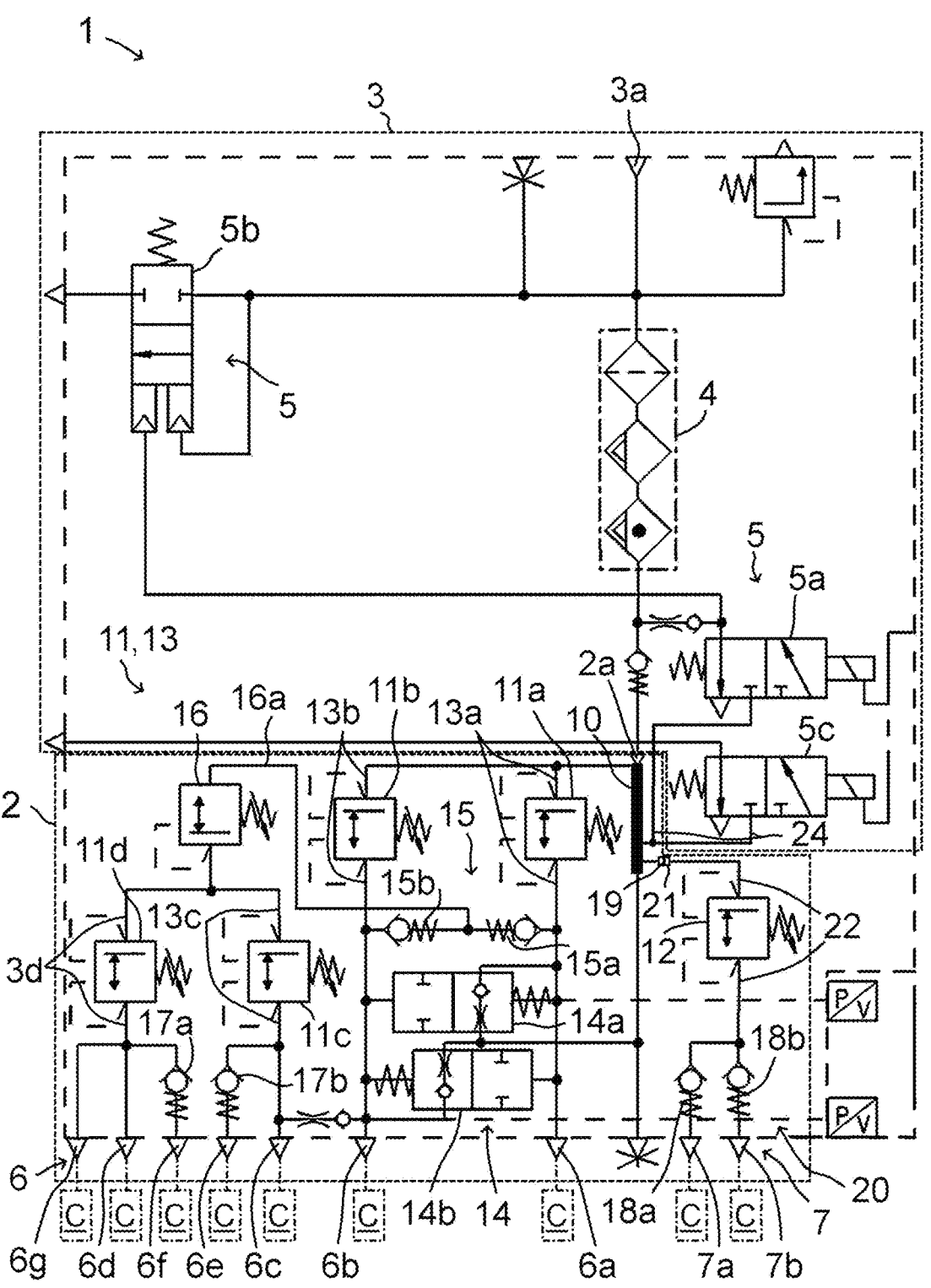
FIG. 1 is a pneumatic scheme of an air processing unit comprising a multi circuit protection valve assembly.

FIG. 1 shows a pneumatic scheme of an air processing unit 1 comprising a multi-circuit protection valve assembly 2 and an air supply unit 3, the air supply unit 3 having a compressor port 3a, an air dryer cartridge 4 and operating valves 5 for setting different operating phases of the air supply unit 3. A compressor (not shown) can be connected to the compressor port 3a for providing compressed air that is dried in the air dryer cartridge 4 before it is supplied to the multi-circuit protection valve assembly 2 via an air inlet 2a. Via an output side of the multi-circuit protection valve assembly 2 the dried compressed air is distributed to different consumer circuits C via main outlets 6; 6a-6g and extension outlets 7; 7a, 7b. For example, the consumer circuits C may be (service, parking) brake circuits of the commercial vehicle, an air suspension system with suspension bellows and lift bellows, a pneumatically actuated gearing mechanism, a trailer supply circuit, and other possible pneumatic consumers.

Further, the air dryer cartridge 4 can preferably be regenerated in a regeneration mode by taking air from the multi-circuit protection valve assembly 2, e.g., via a regeneration valve 5a as one of the operating valves 5 of the air supply unit 3, and that is purged via a purging valve 5b as another operating valve 5. Further, a compressor valve 5c is provided as another operating valve 5, wherein the compressor valve 5c is for switching off the compressor.

The air inlet 2a of the multi-circuit protection valve assembly 2 is connected to a supply channel 10 that distributes the dried compressed air to different main overflow valves 11; 11a-11d protecting the main outlets 6; 6a-6g and an extension overflow valve 12 protecting the extension outlets 7; 7a, 7b. Therefore, each of the main and extension overflow valves 11,12 is adapted to open once the pressure in the supply channel 10 exceeds a predetermined opening pressure for allowing the compressed air to flow to the respective main and extension outlets 6, 7. On leakages in one of the consumer circuits, the respective main or extension overflow valve 11, 12 assigned to the main or extension outlet 6, 7 leading to the leaking consumer circuit C is automatically switching into its closed position, preventing the leakage to have an impact on the other consumer circuits C.

The first main outlet 6a is protected by a first main overflow valve 11a located in a first main supply line 13a and the second main outlet 6b is protected by a second main overflow valve 11b located in a second main supply line 13b. A bypass valve arrangement 14, comprising a first bypass valve 14a and a second bypass valve 14b, is located between the first main supply line 13a and the second main supply line 13b, wherein each bypass valve 14a, 14b is spring loaded and pressure controlled by these main supply lines 13a and 13b, thereby enabling a pressure balance between these main supply lines 13a, 13b.

A double check valve arrangement 15, comprising a first check valve 15a and a second check valve 15b is arranged between the first main supply line 13a and the second main supply line 13b behind the first and second main overflow valves 11a, 11b. The double check valve arrangement 15 allows to provide air from both main supply lines 13a, 13b to a pressure limiting valve 16 via an auxiliary line 16a while ensuring that both main supply lines 13a, 13b stay separated from each other. The pressure limiting valve 16 provides air to a third main overflow valve 11c located in a third main supply line 13c and to a fourth main overflow valve 11d located in a fourth main supply line 13d. This allows to protect a third main outlet 6c and a fifth main outlet 6e connected to the third main overflow valve 11c and a fourth main outlet 6d, a sixth main outlet 6f and a seventh main outlet 6g, each connected to the fourth main overflow valve 11d. Additionally, a third check valve 17a and a fourth check valve 17b might be located before the fifth and the sixth main outlets 6e, 6f, respectively.

In order to extend this pneumatic layout already having four protected circuits (11a-11d) with seven main ports or main outlets 6; 6a-6g (as shown in this embodiment), an extension part 20 is included in the multi-circuit protection valve assembly 2. The extension part 20 comprises an extension inlet 21 that is connected to the supply channel 10 via an auxiliary outlet 19. The extension overflow valve 12 is located in an extension line 22 emanating from the extension inlet 21. The extension overflow valve 12 is connected to each of the extension outlets 7; 7a, 7b via additional fifth and sixth check valves 18a, 18b, respectively. Hence, air provided in the supply channel 10 is also supplied to the respective extension outlet 7; 7a, 7b protected by the extension overflow valve 12, thus, providing a fifth protected circuit with two additional extension ports.

In addition, a control line 24 is connected to the supply channel 10, wherein the control line 24 leads to the regeneration valve 5a and the compressor valve 5c. In the respective switching position of the regeneration valve 5a or the compressor valve 5c, the control pressure in the control line 24 (or supply channel 10) can be used to carry out the respective function, e.g., providing air under control pressure for regenerating the air dryer cartridge 4 or switching the compressor.

Figure 3:
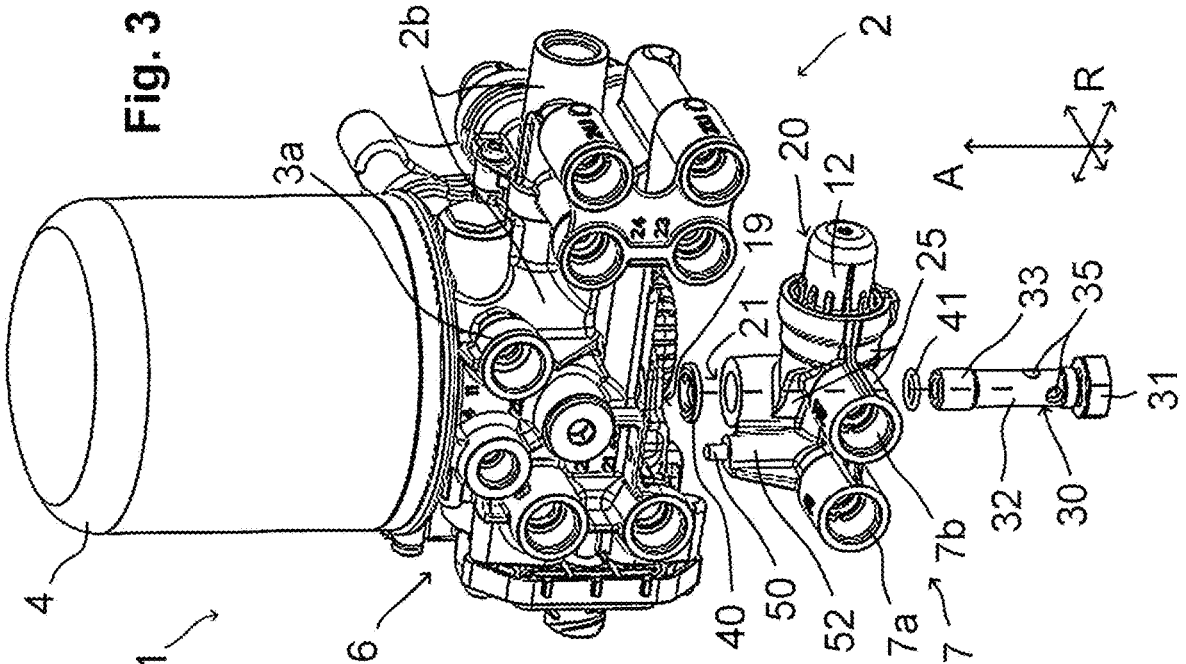
Figure 2:
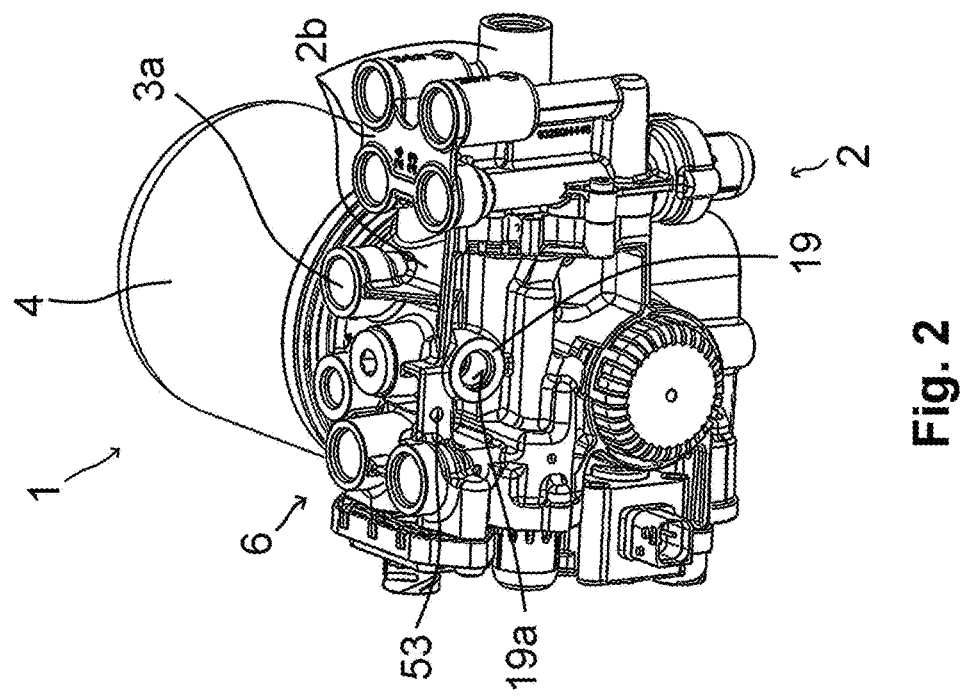
FIG. 2, 3 are perspective views of the air processing unit according to FIG. 1.

As can be seen from FIGS. 2 and 3, the multi-circuit protection valve assembly 2 comprises a main housing 2b that is one-parted or multi-parted, e.g., with several die casted parts screwed or bonded together. The main housing 2b can be made of, e.g., resin, another plastic material or metal. The main housing 2b comprises or encloses the elements of the multi-circuit protection valve assembly 2, in particular, the air inlet 2a, the main outlets 6, the auxiliary outlet 19, the supply channel 10, the main overflow valves 11, the bypass valve arrangement 14, the double check valve arrangement 15, the pressure limiting valve 16, the check valves 17a, 17b, the lines 13, 16a, etc., But also, elements of the air supply unit 3, in particular, the compressor port 3a, the operating valves 5, the air dryer cartridge 4, etc., are attached to or incorporated in this main housing 2b.

Further, the extension part 20 of the multi-circuit protection valve assembly 2 is a separate part that comprises an extension housing 25, e.g., a one-parted die casting part, made of, e.g., resin, another plastic material or metal. The extension housing 25 is detachably fixed to the main housing 2b via the auxiliary outlet 19, as can be seen from FIGS. 3 and 4. Therefore, the extension housing 25 comprises a hollow cylindrical coupling part 26 with the extension inlet 21 being formed by a first opening 27a at a first terminal end 26a of the coupling part 26. A second terminal end 26b of the coupling part 26 comprises a second opening 27b which is for receiving a hollow screw 30 or banjo bolt.

The hollow screw 30 comprises a closed head 31 on one end, a shaft 32 and an end region 33 opposite to the head 31, wherein the end region 33 has an external thread 33a on its outer surface. Further, the end region 33 comprises an axial opening 34 (opening in an axial direction A with respect to the hollow screw 30) that transitions into a cavity 36 that axially extends through the end region 33 and the shaft 32 of the hollow screw 30 and that is axially delimited by an intermediate part 37 joint to or integral with the head 31. Further, several radial openings 35 (openings in a radial direction R in relation to the hollow screw 30) are formed in the wall of the shaft 32 that are fluidly connected to the cavity 36.

The hollow screw 30 can be axially inserted into the second opening 27b of the coupling part 26 until the head 31 touches the second terminal end 26b of the coupling part 26. In this position, at least the shaft 32 is coaxially located in a cylindrical inner chamber 28 of the coupling part 26 that connects the first opening 27a and the second opening 27b. In addition, the threaded end region 33 of the hollow screw 30 protrudes out of the second opening 27b. This allows the hollow screw 30 to be screwed into the auxiliary outlet 19 of the main housing 2b after positioning the extension inlet 21 coaxial to the auxiliary outlet 19. Therefore, the auxiliary outlet 19 comprises an internal thread 19a matching the external thread 33a of the end region 33 of the hollow screw 30.

Figures 4, 5, 6:
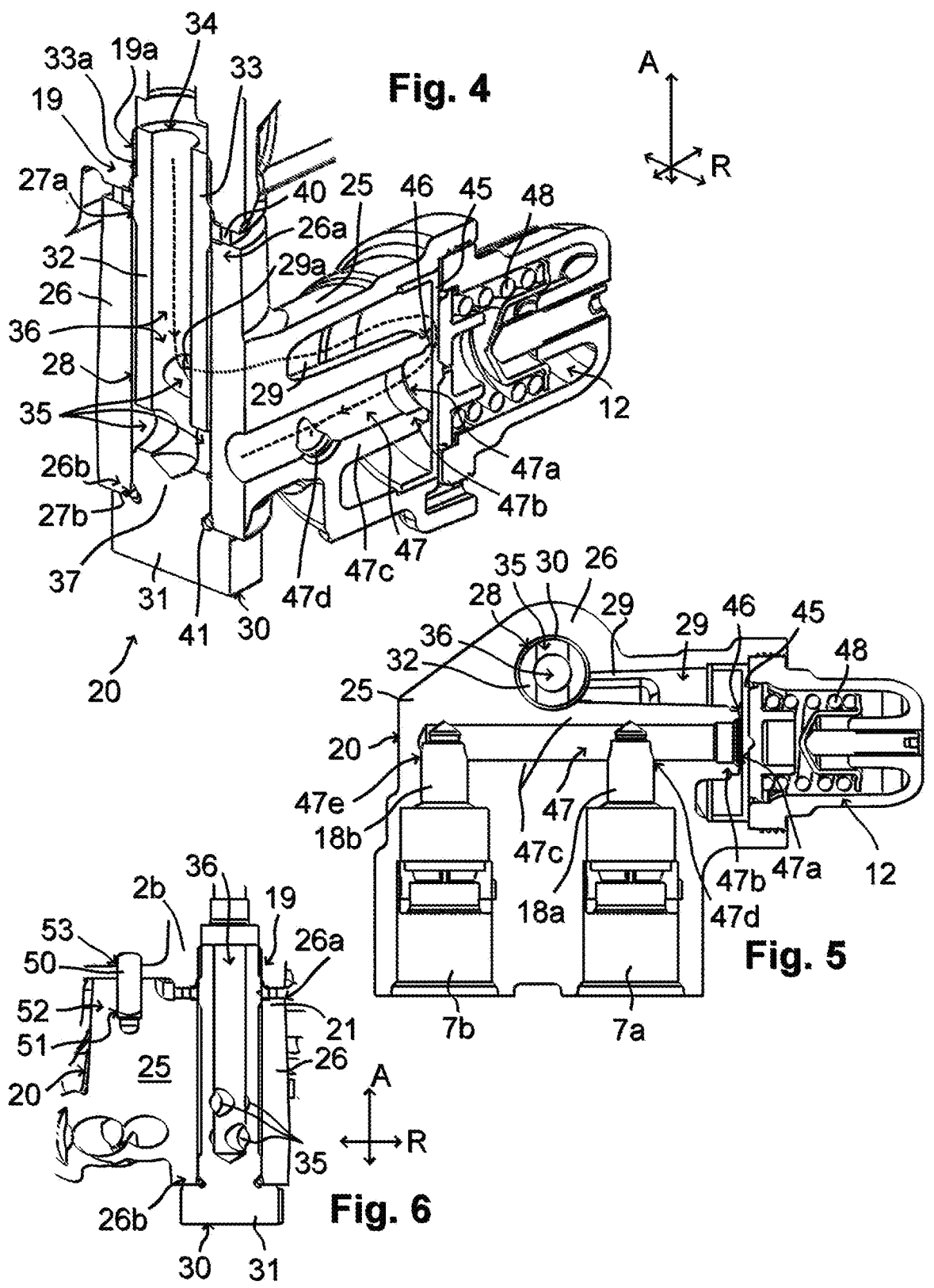
FIG. 4-6 are detailed views of an extension part of the multi circuit protection valve assembly.

In the completely screwed-in state of the hollow screw 30, the coupling part 26 is clamped between the auxiliary outlet 19 of the main housing 2b and the head 31 of the hollow screw 30, as can be seen from FIGS. 4 and 6. Consequently, the extension part 20 can be attached to the main housing 2b via the hollow screw 30 in the first place. In addition, the construction of the hollow screw 30 allows the compressed air coming from the supply channel 10 to successively flow through the axial opening 34 of the hollow screw 30, the cavity 36, the radial openings 35 and into a feeding chamber 29.

The feeding chamber 29 is formed in the extension housing 25, for example, running vertically away from the cylindrical inner chamber 28 of the coupling part 26 and the cavity 36 of the hollow screw 30 coaxially located therein. The cylindrical inner chamber 28 and the feeding chamber 29 are flow-connected via a feeding opening 29a. To allow compressed air to flow from the cavity 36 inside the hollow screw 30 into the feeding chamber 29, at least one of the radial openings 35 in the shaft 32 of the hollow screw 30 is at least partly overlapping with the feeding opening 29a of the feeding chamber 29, once the hollow screw 30 is in its screwed-in state. Thereby, as several radial openings 35 are formed in the wall of the shaft 32, it is ensured that, regardless of the final position of the hollow screw 30 after tightening, the required airflow from the cavity 36 to the feeding chamber 29 can be provided, as at least one of the radial openings 35 always overlaps the feeding chamber 29 or the feeding opening 29a at least partially.

On the opposite side of the feeding opening 29a the feeding chamber 29 is enclosed or delimited by a spring-preloaded piston 45 that is a part of the extension overflow valve 12 being integrated into the extension housing 25 as well. The piston 45 is pressed against a valve seat 46 that is located around a circumference 47a of a terminal end 47b of an outlet channel 47 that is also integrally formed in the extension housing 25. In the shown embodiment, the feeding chamber 29 is coaxially surrounding the cylindrical shaped outlet channel 47, both being separated by an outlet wall 47c.

In the state of the extension overflow valve 12, shown in FIGS. 4 and 5, compressed air inside the feeding chamber 29 cannot flow into the outlet channel 47, as it is blocked by the piston 45 touching the valve seat 46. However, once the air pressure inside the feeding chamber 29 (and the supply channel 10) is high enough to overcome the spring force of the spring 48 preloading the piston 45, the piston 45 is lifted from the valve seat 46 allowing compressed air to flow from the feeding chamber 29 into the outlet channel 47, as indicated by a dashed-dotted line in FIG. 4. Hence, the cavity 36 inside the hollow screw 30 in the cylindrical inner chamber 28, the feeding chamber 29 and the outlet channel 47 are an exemplary implementation of the extension line 22 in which the extension overflow valve 12 is located and that is described above based on the pneumatic scheme of FIG. 1.

As shown in FIG. 5, the outlet channel 47 comprises two valve openings 47d, 47e. The fifth check valve 18a is placed in the first valve opening 47d and the sixth check valve 18b is placed in the second valve opening 47e, e.g., via screwing or similar methods having the same effect. The check valves 18a, 18b are individually terminating into the respective extension outlets 7; 7a, 7b intended for connecting to the respective consumer circuits C.

Hence, the extension part 20 can easily be attached to the main housing 2b via the hollow screw 30 to extend the functionality of the multi-circuit protection valve assembly 2 by providing two additional extension outlets 7; 7a, 7b that are protected against spreading leakages. On pressure loss in the outlet channel 47, e.g., due to such a leakage in a certain consumer circuit C connected to one of the extension outlets 7; 7a, 7b, the piston 45 is automatically pressed against the valve seat 46 by the spring force of the spring 48 preventing a pressure loss in the feeding chamber 29 as well as in the supply channel 10 connected thereto.

As can be seen from FIG. 3, 4 or 6, a first sealing member 40, e.g., a sealing ring, is placed between the first terminal end 26a of the coupling part 26 and the auxiliary outlet 19, wherein the first sealing member 40 might additionally be secured by bonding. A second sealing member 41, e.g., a sealing ring, is placed or clamped between the second terminal end 26b of the coupling part 26 and the head 31 of the hollow screw 30. Both sealing members 40, 41 ensure a gas-tight sealing of the extension part 20.

As can be seen from FIGS. 3 and 6 the extension part 20 is additionally secured to the main housing 2b by a pin 50 as a securing means. The pin 50 is accommodated in a securing recess 51 formed in the extension housing 25 of the extension part 20, e.g., in a hollow cylindrical securing part 52 that is integral with the extension housing 25. For example, the pin 50 might be screwed and/or bonded and/or snapped into the securing recess 51. The pin 50 projects out of the securing recess 51 such that it passes through a securing opening 53 in the main housing 2b, e.g., in a plate-like structure integral with the main housing 2b. This ensures that the extension part 20 cannot be twisted and/or tilted against the main housing 2b.

LIST OF REFERENCE NUMERALS (PART OF THE DESCRIPTION)

1 air processing unit
2 multi-circuit protection valve assembly
2a air inlet
2b main housing
3 air supply unit
3a compressor port
4 air dryer cartridge
5 operating valves
5a regeneration valve
5b purging valve
5c compressor valve
6 main outlet
6a first main outlet
6b second main outlet
6c third main outlet
6d fourth main outlet
6e fifth main outlet
6f sixth main outlet
6g seventh main outlet
7 extension outlet
7a first extension outlet
7b second extension outlet
10 supply channel
11 main overflow valve
11a first main overflow valve
11b second main overflow valve
11c third main overflow valve
11d fourth main overflow valve
12 extension overflow valve
13 main supply line
13a first main supply line
13b second main supply line
13c third main supply line
13d fourth main supply line
14 bypass valve arrangement
14a first bypass valve
14b second bypass valve
15 double check valve arrangement
15a first check valve
15b second check valve
16 pressure limiting valve
16a auxiliary line
17a third check valve
17b fourth check valve
18a fifth check valve
18b sixth check valve
19 auxiliary outlet
19a internal thread of the auxiliary outlet
20 extension part
21 extension inlet
22 extension line
24 control line
25 extension housing
26 coupling part
26a first terminal end
26b second terminal end

27a first opening
27b second opening
28 inner chamber
29 feeding chamber
29a feeding opening
30 hollow screw
31 head of the hollow screw 30
32 shaft of the hollow screw 30
33 end region of the hollow screw 30
33a external thread of the end region 33
34 axial opening
35 radial openings
36 cavity
37 intermediate part
40 first sealing member
41 second sealing member
45 piston
46 valve seat
47 outlet channel
47a circumference of the terminal end 47b
47b terminal end of the outlet channel 47
47c outlet wall
47d first valve opening
47e second valve opening
48 spring of the extension overflow valve 12
50 pin
51 securing recess
52 securing part of the extension housing 25
53 securing opening
A axial direction
C consumer circuit
R radial direction

The invention claimed is:

1. A multi-circuit protection valve assembly for a pressurized air system of a commercial vehicle, comprising an air inlet for receiving compressed air;

at least two main outlets for discharging the received compressed air to at least two consumer circuits that are each coupled to one of the respective main outlets;

at least two main supply lines each being flow-connected or flow-connectable to said air inlet and each being flow-connected or flow-connectable to at least one of said main outlets for distributing the compressed air to the at least two main outlets; and at least two main overflow valves each being located in one of said main supply lines for protecting the main outlet flow-connected or flow-connectable to the respective main supply line containing the main overflow valve, wherein the air inlet, the main outlets, the main supply lines and the main overflow valves are attached to or are integrated into a main housing of the multi-circuit protection valve assembly, wherein the multi-circuit protection valve assembly further comprises an extension part having an extension inlet for receiving compressed air;

at least one extension outlet for discharging the received compressed air to a consumer circuit that is coupled to the respective extension outlet;

an extension line being flow-connected or flow-connectable to said extension inlet and to the at least one extension outlet; and an extension overflow valve being located in the extension line for protecting the at least one extension outlet flow-connected or flow-connectable to the extension line containing the extension overflow valve, each being attached or integrated into an extension housing, wherein the extension housing is detachably fixed to the main housing such that the extension inlet is flow-connected to an auxiliary outlet in the main housing, wherein the auxiliary outlet is flow-connected or flow-connectable to said air inlet in the main housing, wherein:

the extension housing is detachably fixed to the main housing by a hollow screw having a cavity, wherein said hollow screw passes through the extension housing and is screwed into the auxiliary outlet:

such that the extension housing is clamped to the main housing, and such that compressed air discharged through the auxiliary outlet can be conducted through the cavity inside the hollow screw to the extension overflow valve and the at least one extension outlet.

2. The multi-circuit protection valve assembly according to claim 1, wherein the extension housing comprises a coupling part having an inner chamber with a first opening at a first terminal end, the first terminal end forming the extension inlet, wherein the hollow screw extends through said inner chamber and an end region of the hollow screw protrudes out of the first opening of the inner chamber, wherein the end region comprises an external thread being screwed into the auxiliary outlet for clamping the extension housing to the main housing via the hollow screw.

3. The multi-circuit protection valve assembly according to claim 2, wherein the end region of the hollow screw comprises an axial opening that transitions into the cavity for receiving compressed air from the auxiliary outlet.

4. The multi-circuit protection valve assembly according to claim 2, wherein the inner chamber of the coupling part comprises a second opening at a second terminal end opposite to the first terminal end, wherein the hollow screw protrudes out of the second opening, wherein a head of the hollow screw, being positioned opposite to the end region, touches the second terminal end of the coupling part for clamping the extension housing to the main housing via the hollow screw.

5. The multi-circuit protection valve assembly according to claim 2, wherein a shaft of the hollow screw, located between a head of the hollow screw and the end region, is coaxially positioned inside the inner chamber of the coupling part, wherein the cavity coaxially extends through the shaft and through the end region, wherein at least one radial opening is provided in the shaft that is flow-connected with the cavity inside the shaft.

6. The multi-circuit protection valve assembly according to claim 5, wherein the extension housing further comprises a feeding chamber, wherein the at least one radial opening in the shaft provides a flow-connection between the cavity inside the shaft and the feeding chamber in the extension housing, in particular, in that the at least one radial opening at least partially overlaps with a feeding opening in the feeding chamber.

7. The multi-circuit protection valve assembly according to claim 6, wherein the feeding opening connects the inner chamber with the feeding chamber.

8. The multi-circuit protection valve assembly according to claim 6, wherein the feeding chamber is delimited by a movable piston that is a part of the extension overflow valve such that the air pressure inside the feeding chamber is also acting on the piston, wherein the piston is guided in the extension housing and interacts with a spring that spring-preloads the piston against a valve seat, in particular, such that a flow-connection to an outlet channel leading to the at least one extension outlet:

is prevented as long as the spring-preloaded piston touches the valve seat, and is permitted once the air pressure inside the feeding chamber is high enough to lift the spring-preloaded piston from the valve seat.

9. The multi-circuit protection valve assembly according to claim 8, wherein the valve seat is located around a circumference of a terminal end of the outlet channel that is integrally formed in the extension housing, such that a flow-connection between the feeding chamber and the outlet channel is prevented as long as the spring-preloaded piston touches the circumference of the terminal end.

10. The multi-circuit protection valve assembly according to claim 9, wherein the feeding chamber is cylindrically shaped and coaxially surrounds the outlet channel.

11. The multi-circuit protection valve assembly according to claim 8, wherein at least a first valve opening, is formed in the outlet channel for connecting the outlet channel to the at least one extension outlet.

12. The multi-circuit protection valve assembly according to claim 11, wherein at least a fifth check valve is positioned in the first valve opening.

13. The multi-circuit protection valve assembly according to claim 6, wherein at least the cavity of the hollow screw and the feeding chamber form the extension line of the extension part.

14. The multi-circuit protection valve assembly according to claim 1, wherein the extension part is additionally secured to the main housing by a pin inserted into the extension housing of the extension part and into the main housing for preventing a tilting and/or twisting of the extension housing against the main housing.

15. The multi-circuit protection valve assembly according to claim 14, wherein the pin is inserted into a securing recess in the extension housing and passes through a securing opening in the main housing.

16. The multi-circuit protection valve assembly according to claim 1, wherein no main overflow valve and no extension overflow valve is located between the air inlet in the main housing and the auxiliary outlet in the main housing.

17. The multi-circuit protection valve assembly according to claim 1, wherein it comprises at least four main overflow valves in at least four main supply lines, and wherein the main housing is one-parted or multi-parted, including the at least four main overflow valves and the at least four main supply lines, wherein the main housing comprises up to seven main outlets.

18. An air processing unit comprising the multi-circuit protection valve assembly according to claim 1, and an air supply unit having a compressor port for connecting a compressor, an air dryer cartridge, operating valves for setting operating phases of the air supply unit, wherein the air supply unit is connected to the air inlet of the multi-circuit protection valve assembly.

19. The air processing unit according to claim 18, wherein the air supply unit is at least partially attached to or integrated into the main housing.

* * * * *